(12) United States Patent
Haynes et al.

(10) Patent No.: US 10,502,608 B2
(45) Date of Patent: Dec. 10, 2019

(54) THROUGH AIR RADAR LEVEL TRANSMITTER WITH GALVANIC ISOLATION

(71) Applicant: Magnetrol International, Incorporated, Aurora, IL (US)

(72) Inventors: Kevin M. Haynes, Lombard, IL (US); Timothy S. Sussman, Bolingbrook, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 183 days.

(21) Appl. No.: 15/676,170

(22) Filed: Aug. 14, 2017

(65) Prior Publication Data

US 2018/0209833 A1    Jul. 26, 2018

Related U.S. Application Data

(60) Provisional application No. 62/449,647, filed on Jan. 24, 2017.

(51) Int. Cl.
    *G01F 23/284*     (2006.01)
    *H02J 50/10*     (2016.01)
    (Continued)

(52) U.S. Cl.
    CPC .............. *G01F 23/284* (2013.01); *B08B 3/08* (2013.01); *B08B 5/02* (2013.01); *G01S 7/003* (2013.01);
    (Continued)

(58) Field of Classification Search
    CPC ........ G01F 23/284; G01F 23/28; H02J 50/10; H02J 50/80; G01S 7/003; G01S 13/10;
    (Continued)

(56) References Cited

U.S. PATENT DOCUMENTS 6,062,095 A    6/2000    Mulrooney et al.
7,548,072 B2    6/2009    Griessbaum
(Continued)

FOREIGN PATENT DOCUMENTS

EP      0518916 B1      7/1997

OTHER PUBLICATIONS

International Search Report and Written Opinion for corresponding PCT Application No. PCT/US2018/014411 dated Apr. 5, 2018.

*Primary Examiner* — Hal Kaplan
(74) *Attorney, Agent, or Firm* — Wood, Phillips, Katz, Clark & Mortimer (57) ABSTRACT

A loop powered process instrument comprises a control system measuring a process variable and developing a measurement signal representing the process variable. A two-wire circuit, for connection to a remote power source using a two-wire process loop, controls current on the loop in accordance with the measurement signal. A power supply with galvanic isolation is connected to the two-wire circuit and the control system to isolate the two-wire circuit from the control system. The power supply receives power from the two-wire process loop and supplies power to the control system. The power supply comprises a voltage regulator receiving loop power and developing a regulated output voltage. A current switching circuit receives the regulated output voltage and drives a primary of a transformer. A secondary of the transformer is coupled to the control system. A voltage shift control includes an isolator circuit driven by the control system for controlling voltage supplied by the voltage regulator.

20 Claims, 6 Drawing Sheets

(51) Int. Cl.
    *H01Q 1/22*     (2006.01)
    *H01Q 13/06*     (2006.01)
    *H01Q 19/08*     (2006.01)
    *G08C 19/02*     (2006.01)
    *G01S 13/88*     (2006.01)
    *G01S 7/00*     (2006.01)
    *G01S 13/10*     (2006.01)
    *H02J 50/80*     (2016.01)
    *B08B 3/08*     (2006.01)
    *B08B 5/02*     (2006.01)
    *H01Q 13/02*     (2006.01)
    *G01S 7/02*     (2006.01)

(52) U.S. Cl.
    CPC ............... *G01S 13/10* (2013.01); *G01S 13/88* (2013.01); *G08C 19/02* (2013.01); *H01Q 1/22* (2013.01); *H01Q 1/225* (2013.01); *H01Q 13/06* (2013.01); *H01Q 19/08* (2013.01); *H02J 50/10* (2016.02); *H02J 50/80* (2016.02); *G01S 2007/027* (2013.01); *H01Q 13/02* (2013.01)

(58) Field of Classification Search
    CPC ...... G01S 13/88; G01S 2007/027; G01S 7/00; G08C 19/02; H01Q 1/22; H01Q 1/225; H01Q 13/02; H01Q 13/06; H01Q 19/09
    USPC ........................................................ 307/104
    See application file for complete search history.

(56) References Cited

U.S. PATENT DOCUMENTS

| | | |
|---|---|---|
| 2004/0100281 A1 | 5/2004 | Nilsson |
| 2008/0074309 A1 | 3/2008 | Nilsson |
| 2010/0299542 A1 | 11/2010 | Westfield et al. |
| 2017/0244326 A1* | 8/2017 | Petrovic ............ H02M 3/33507 |

* cited by examiner

THROUGH AIR RADAR LEVEL TRANSMITTER WITH GALVANIC ISOLATION

CROSS-REFERENCE TO RELATED APPLICATIONS

This application claims priority of provisional application No. 62/449,647, filed Jan. 24, 2017.

FEDERALLY SPONSORED RESEARCH OR DEVELOPMENT

Not Applicable.

MICROFICHE/COPYRIGHT REFERENCE

Not Applicable.

FIELD

This invention relates to process control instruments and, more particularly, to a measurement instrument with galvanic isolation.

BACKGROUND

Process control systems require the accurate measurement of process variables. Typically, a sensor in the form of a primary element senses the value of a process variable and a transmitter develops an output having a value that varies as a function of the process variable. For example, a level transmitter includes a primary element for sensing level and a circuit for developing an electrical signal representing sensed level.

Knowledge of level in industrial process tanks or vessels has long been required for safe and cost-effective operation of plants. Many technologies exist for making level measurements. These include buoyancy, capacitance, ultrasonic and microwave radar, to name a few.

In one form, a through air measurement instrument, such as a microwave radar level transmitter, launches a radar signal which reflects off a liquid or other surface and the instrument measures time of flight between transmission and reception of the radar signal. Electrical energy is converted to an electromagnetic wave from a launch element. The wave propagates through free space.

A two-wire transmitter includes two terminals connected to a remote power supply. The transmitter loop current, drawn from the power supply, is proportional to the process variable. A typical instrument operates off of a 24 volt DC power supply and varies the signal current in the loop between 4 and 20 milliamps (mA) DC. Thus, the instrument must operate with current less than 4 milliamps.

While low power circuits are continuously developed, there are other increasing demands placed on performance capabilities of the process control instruments. For example, with a radar level measurement device, the instrument's performance is enhanced by more powerful digital signal processing techniques driven by a microprocessor. In addition to the microprocessor, there are several other circuits, such as the radar transceiver, which requires electric power. To be successful, the instrument must use optimum processing capability and speed. This means making maximum power from the loop available to the electronics, and using it efficiently.

More recently, the loop powered instruments have utilized digital communications. In normal operation, the instrument must allow for 4 mA to 20 mA loop currents while still communicating digital signals via modulation of the loop current. Loop currents as low as 3.6 mA or as high as 22 mA are allowed when the transmitter detects a fault condition. This means that the power available at the input to the switching power supply, which powers the entire transmitter, will be based on input voltage to the switching power supply and the nominal loop current. However, the actual power available will also be based on the efficiency of the switching power supply. In addition, it is necessary to maintain high input impedance for digital communications.

The present invention is directed to solving one or more of the problems discussed above in a novel and simple manner.

SUMMARY

As described herein, a loop powered instrument uses a galvanic isolation circuit while maintaining a lower minimum power to the unit which allows a lower minimum supply voltage to the unit.

Broadly, there is disclosed a loop powered process instrument comprising a control system measuring a process variable and developing a measurement signal representing the process variable. A two-wire circuit, for connection to a remote power source using a two-wire process loop, controls current on the loop in accordance with the measurement signal. A power supply with galvanic isolation is connected to the two-wire circuit and the control system to isolate the two-wire circuit from the control system. The power supply receives power from the two-wire process loop and supplies power to the control system. The power supply comprises a voltage regulator receiving loop power and developing a regulated output voltage. A current switching circuit receives the regulated output voltage and drives a primary of a transformer. A secondary of the transformer is coupled to the control system. A voltage shift control includes an isolator circuit driven by the control system for controlling voltage supplied by the voltage regulator.

It is a feature that the voltage shift control circuit shifts the voltage regulator voltage to a higher value at lower current levels and to a lower value at higher current levels.

It is another feature that the isolator circuit comprises an optical coupler controlled by the control system.

It is a further feature that the voltage supplied by the voltage regulator is set by plural voltage reference devices and the voltage shift control circuit comprises an optical coupler controlled by the control system to selectively shift the voltage.

It is a further feature that the voltage supplied by the voltage regulator is set by plural voltage reference devices and the voltage shift control circuit comprises a plurality of optical couplers controlled by the control system to selectively shift the voltage.

It is an additional feature that the current switching circuit converts a 1-to-1 current across the transformer. The current switching circuit may comprise a switching oscillator of the DC-DC converter circuit and the oscillator drives the primary of the transformer. The switching frequency of the switching oscillator may be about 150 kHz to pass lower frequency communication signals.

It is yet another feature that the control system controls loop current at the secondary of the transformer.

It is another feature to provide a dual compartment housing and the two-wire circuit and the power supply are in an explosion proof compartment of the housing and the control system is in an intrinsically safe compartment of the housing.

There is disclosed herein in accordance with another aspect a two-wire transmitter comprising a dual compartment housing defining a wiring compartment and a control compartment. A control system in the control compartment includes a signal processing circuit measuring a process variable and developing a measurement signal representing the process variable. A two-wire circuit and a power supply are in the wiring compartment. The two-wire circuit is for connection to a remote power source using a two-wire process loop, for controlling current on the loop in accordance with the measurement signal. The power supply is connected to the two-wire circuit and the control system to isolate the two-wire circuit from the control system. The power supply receives power from the two-wire process loop and supplies power to the control system. The power supply comprises a voltage regulator receiving loop power and developing a regulated output voltage. A current switching circuit receives the regulated output voltage and drives a primary of a transformer. A secondary of the transformer is coupled to the control system. A voltage shift control includes an isolator circuit driven by the control system for controlling voltage supplied by the voltage regulator.

Other features and advantages will be apparent from a review of the entire specification, including the drawings and claims.

DETAILED DESCRIPTION

Figure 1:
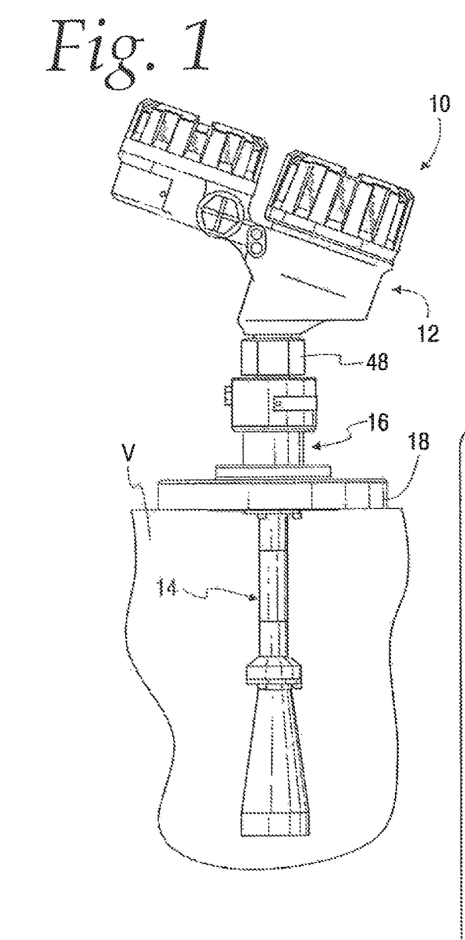
FIG. 1 is a side view of a through air measurement instrument including galvanic isolation in accordance with the invention.
Figure 2:
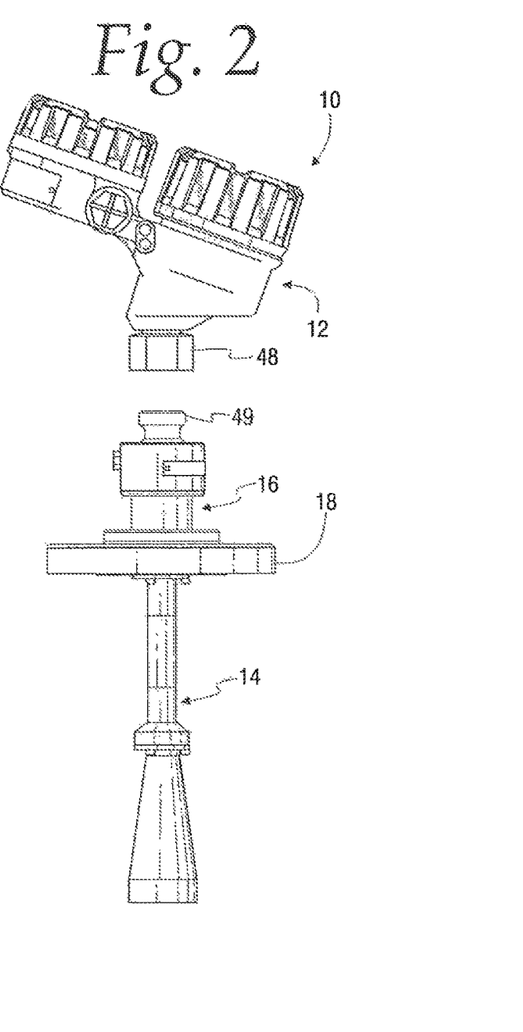
FIG. 2 is a side view, similar to FIG. 1, with a dual compartment control housing separate from a primary element.

Referring to FIGS. 1 and 2, a process control instrument 10, also referred to as a two-wire transmitter, according to the invention is illustrated. The process control instrument 10 uses micro power impulse radar (MIR) in conjunction with equivalent time sampling (ETS) and ultra-wideband (UWB) transceivers for measuring a level using time domain reflectometry (TDR). Particularly, the instrument 10 uses through air radar for sensing level. While the embodiments described herein relate to an MIR level sensing apparatus, various aspects of the invention may be used with other types of process control instruments for measuring various process parameters, such as a rangefinder, as will be apparent to those skilled in the art.

The process control instrument 10 includes a control housing 12 and a sensor or primary element 14. In the illustrated embodiment, the primary element 14 is an antenna.

The antenna 14 includes a process adapter 16 for connection to the housing 12. The process adapter 16 is mounted to a process vessel V, see FIG. 1, using a flange 18. The process adapter 16 may be threaded or welded to the flange 18. Alternatively, the process adapter 16 may be threaded directly into an opening in the process vessel V.

The instrument 10 uses pulse-burst radar technology with ETS circuitry. Short bursts of microwave energy are emitted and subsequently reflected from a surface. The distance is calculated by the equation.

$$D=(\text{velocity of EM propagation})*\text{transit time(round trip)}/2.$$

Level is then calculated by applying a tank height value. ETS is used to measure the high speed, low power electromagnetic (EM) energy. The high-speed EM energy (1,000 ft/$\mu$s) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round-trip event on a 65 ft. tank takes only 133 nanoseconds in real time. After it is reconstructed in equivalent time it measures 200 milliseconds.

The through air radar level measurement instrument 10 launches a radar signal which reflects off a liquid or other surface and measures time of flight between transmission and reception of the radar signal. Electrical energy is converted to an electromagnetic wave from the launching element which propagates through free space. The system operates a signal around 26 GHz.

Figure 3:
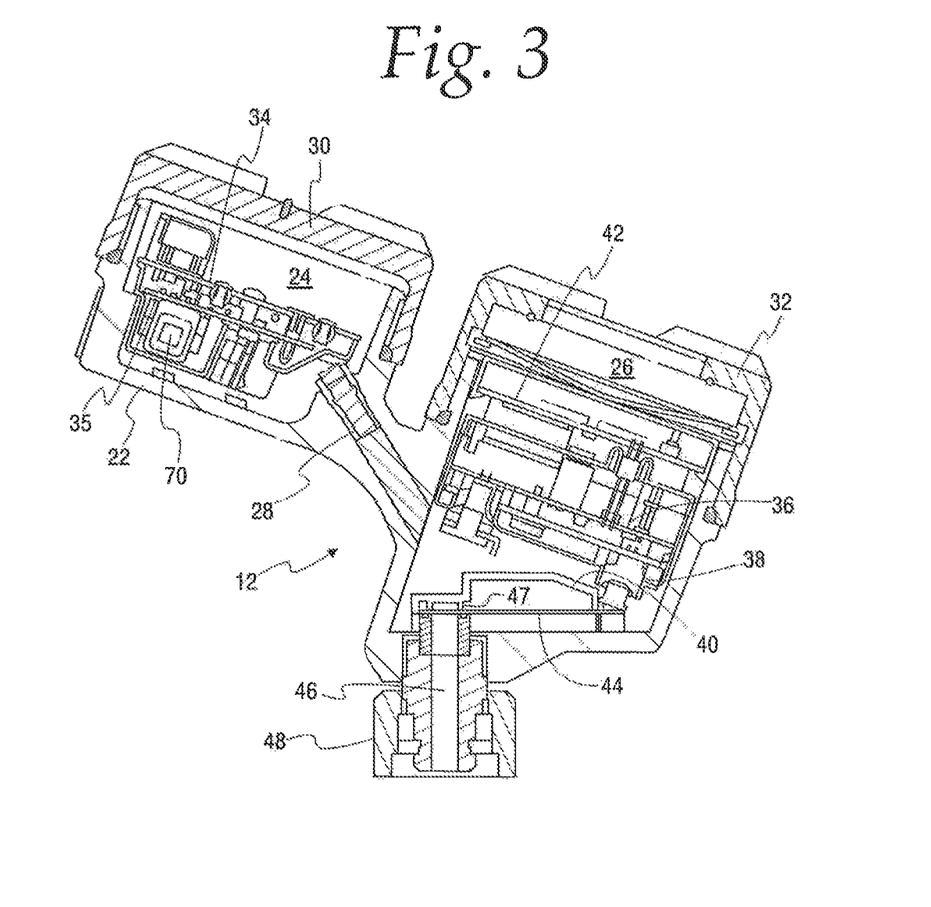
FIG. 3 is a side section view of the dual compartment control housing.

Referring to FIG. 3, the control housing 12 comprises a dual compartment housing including a base 22 defining an explosion proof wiring compartment 24 and an intrinsically safe control compartment 26 connected via a passage 28. A first cover 30 encloses the wiring compartment 24. A second cover 32 encloses the control compartment 26. The wiring compartment 24 houses a wiring board 34 and a galvanic transformer board 35, see FIG. 4, for connecting to a remote power source and including necessary interface circuitry. This circuitry is in communication with a digital PC board 36 and an analog PC board 38 in the control compartment 26. The digital PC board 36 includes a microprocessor for controlling functionality of the overall instrument. The analog PC board 38 includes signal processing circuitry which drives a radio frequency (RF) module 40 and further processes the return signal from the RF module 40. The RF module 40 is in communication with the antenna 14, as described below. A display/keypad PC board 42 is connected to the digital PC board 36 and is viewable through and accessible upon removal of the second cover 32.

The form of the housing 12 and the circuits therein are illustrated and described by way of example only. The invention is particularly directed to galvanic isolation, as described below.

The RF module 40 has a printed circuit board 44 with a conventional launching element. In the illustrated embodiment, the launching element comprises electro-magnetic radiating elements which are conductive traces designed on the circuit board 44. The launching element generates and receives a high frequency signal for measuring level.

An air-filled antenna waveguide 46 is sealingly mounted to the control housing 12 and aligned with the launching element on the printed circuit board 44. Thus, the launching element works together with the waveguide 46 and a waveguide cap 47 to generate the launching signal to the antenna 14, as is known. The air-filled waveguide 46 is adapted to operate in the K-3 band.

The antenna waveguide 46 is surrounded by a quick connect coupler 48 for mating with a corresponding quick connect coupler 49 on the antenna 14, see FIG. 2. This provides a quick connect/disconnect coupling that allows the vessel V to remain sealed upon removal of the control housing 12.

While this application describes the galvanic isolation in connection with a through air radar level transmitter, this circuitry can be used with process control instruments for measuring other parameters and using other technologies including, for example, guided wave radar, capacitance, or the like.

The display/keypad PC board 42 provides a user interface for entering parameters with a keypad and displaying user and status information. The digital PC board 36 would include a conventional microcontroller and memory. The memory may comprise both non-volatile memory for storing programs and calibration parameters, as well as volatile memory used during level measurements. The digital PC board is also connected through the galvanic transformer board 35 to the wiring board 34 for connecting to a remote and external power source over a two-wire loop. The two-wire connection is used to communicate level information, as is well known. The transformer board 35 includes power supply and other circuitry.

As described more particularly below, the circuits in the wiring compartment 24 accept supply voltage at input terminals TB1 from the customer and provide power to the balance of the unit 10 through a galvanically isolated barrier. The galvanic isolation is important because it allows the unit to operate as explosion-proof in the wiring compartment 24 and intrinsically safe (IS) in the control compartment 26, while not requiring a special IS ground wire. Communication signals, such as, for example, HART, Fieldbus or Profibus, or other, must pass cleanly through the circuits.

Figure 5:
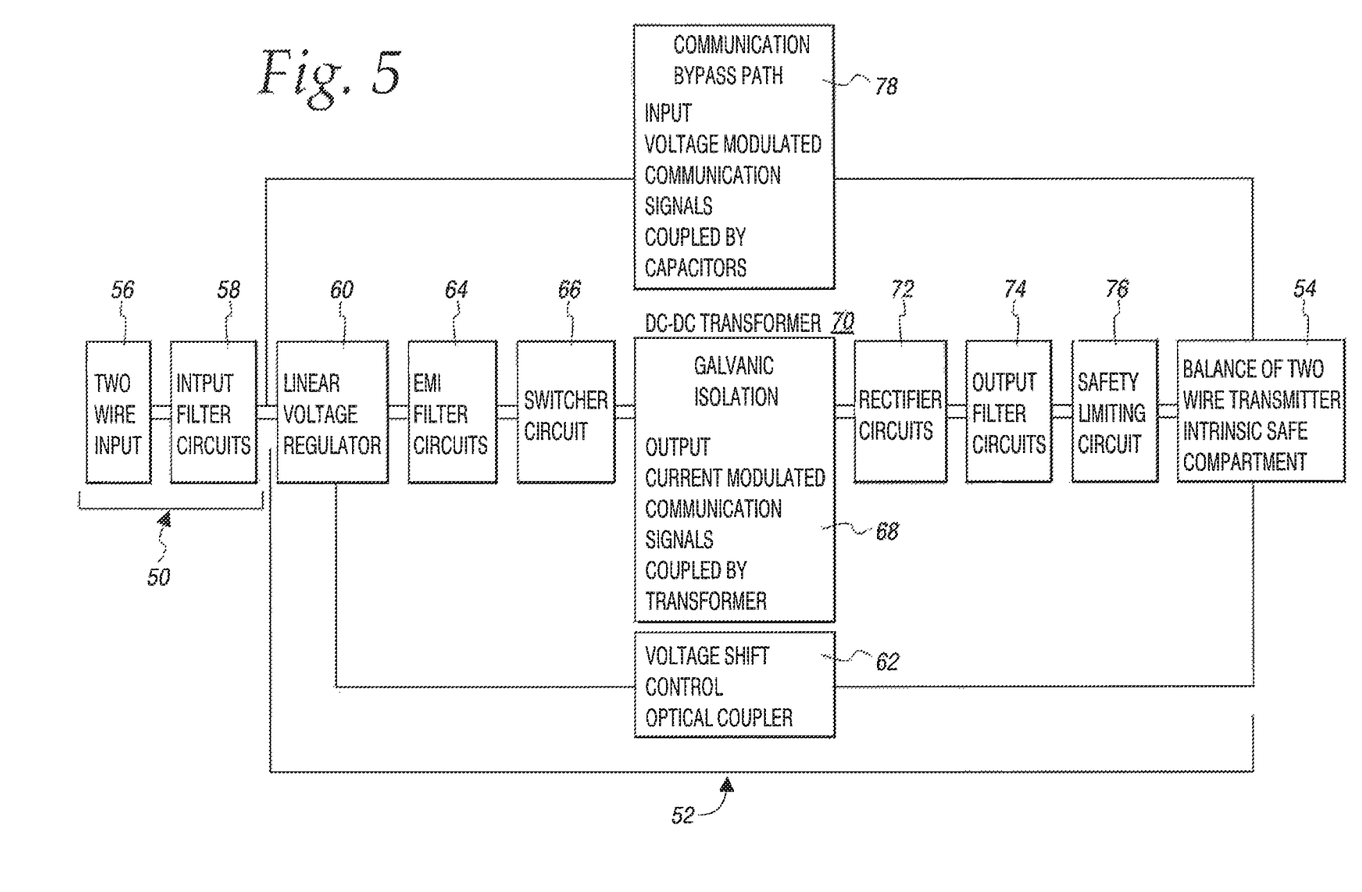
FIG. 5 is a block diagram of the circuitry.

Referring to FIG. 5, a block diagram illustrates the circuitry in the wiring compartments 24 which includes a two-wire circuit 50 and a power supply 52. The two-wire circuit 50 is for connection to a remote power source using a two-wire process loop, as is known, for controlling current on the loop in accordance with a measurement signal from a control system 54 comprising the circuitry in the intrinsically safe control compartment 26. The power supply 52 has a galvanic isolation barrier and is connected between the two-wire circuit 50 and the control system 54 to isolate the two-wire circuit 50 from the control system 54. The power supply 52 receives power from the two-wire process loop and supplies power to the control system 54.

The two-wire circuit 50 comprises a two-wire input block 56 and an input filter circuits block 58. The two-wire input block 56 provides the customer input to the unit at the terminal block TB1, see FIG. 4. This is the user connection to the instrument 10. The user must provide suitable power and the unit will draw loop current based on the level in the process as measured by the control system 54. Typical of most two-wire instruments, this unit will draw 4 mA to 20 mA based on the measured level in the process.

The input filter circuits block 58 includes standard filter circuits that suppress noise from entering deeper into the unit 10 where it could cause damage to the unit 10 or corrupt normal operation.

Figure 4:
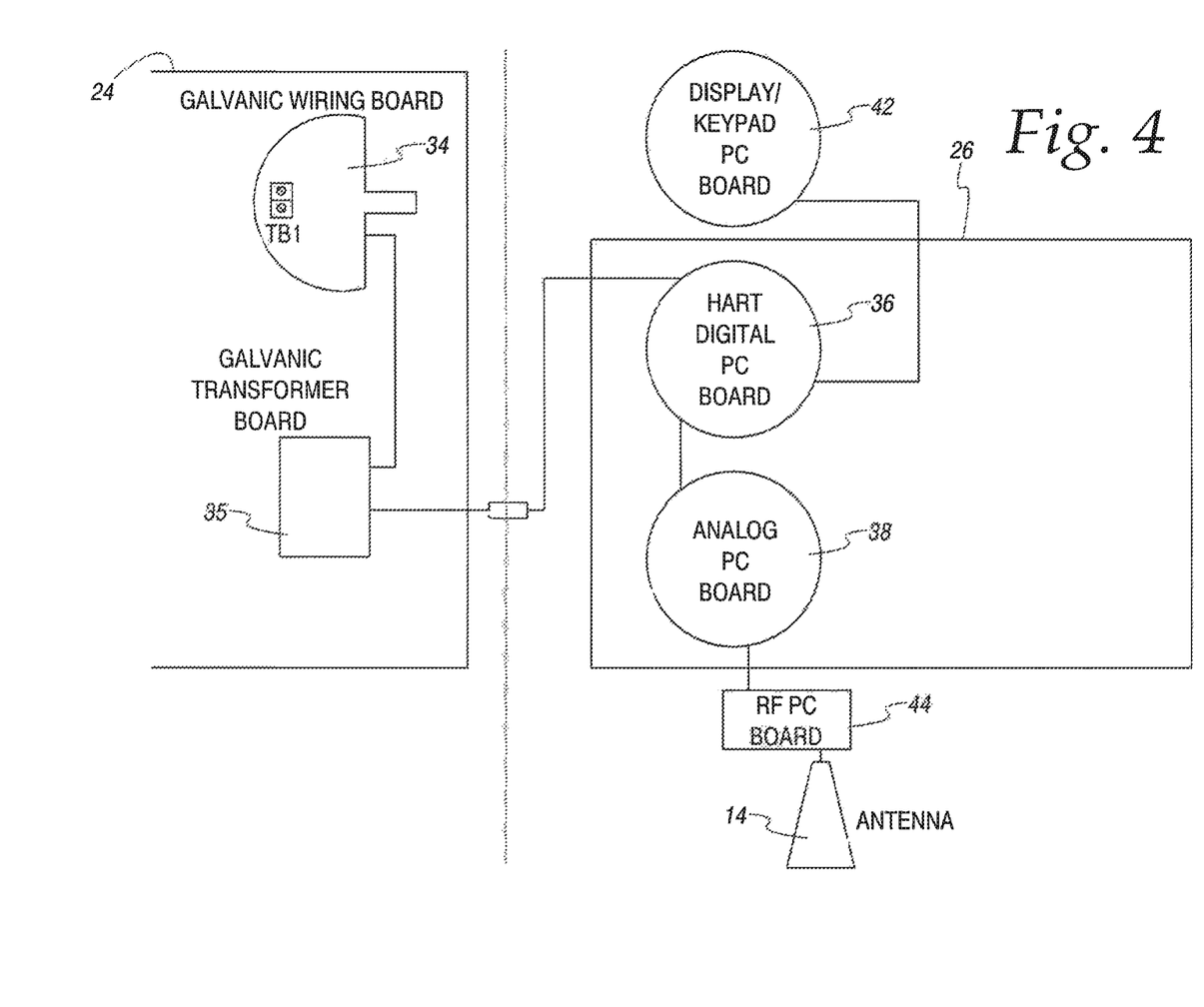
FIG. 4 is a block diagram illustrating the relationship between circuit boards in the dual compartment control housing of FIG. 3.

The power supply 52 is on the galvanic transformer board 35, see FIG. 4. The power supply 52 comprises a linear voltage regulator 60. The voltage is set by voltage reference Zener diodes, discussed below, and can be shifted by the control system 54 using a voltage shift control 62, also discussed below, using an optical coupler, also referred to as an opto-coupler. The voltage regulator 60 makes the input impedance appear high to the digital communication signals. The voltage of the voltage regulator 60 must be lower than the terminal voltage to the transformer board 35. However, the regulator voltage must be high enough to supply sufficient power for the unit 10 to operate properly. The voltage regulator 60 also helps to eliminate noise at the terminals TB1 caused by the circuits deeper in the unit 10. The voltage shift of the regulator voltage, as described below, is important to maintain high input impedance over the range of loop current that must pass the circuit. As described below, the voltage shift of the primary voltage is not a closed loop control of the voltage across a galvanic isolation barrier.

The voltage regulator 60 supplies regulated voltage to EMI filter circuits 64 which filter against electromagnetic interference. A switcher circuit block 66 is connected between the EMI filter circuit 64 and a galvanic isolation block 68 which includes a DC-DC transformer 70. The switcher circuit 66 is the switching oscillator of a DC-DC converter circuit. The oscillator drives the primary of the DC-DC transformer 70. The oscillator is free running so that whenever power is supplied to the board, the switcher is oscillating. The frequency of this switching oscillator must be sufficiently high, such as about 150 kHz, to allow the lower frequency communication signals to be passed cleanly through the circuit. Also, the goal of the overall circuit is to have the secondary current of the transformer 70 to be closely matched by the primary current. The close match of the current allows the loop control to be performed at the secondary of the transformer 70 and yet be tightly coupled to the primary and thus to the user terminals TB1. The current transfer is the critical parameter that must be maintained by these circuits. The current loop control, 4 mA to 20 mA, takes place in the secondary circuits via the control system 54.

The galvanic isolation block 68 uses the DC-DC transformer 70 as the primary component. To assure proper isolation, this transformer 70 must meet several specific IS safety requirements. The transformer must meet high isolation voltage requirements and assure proper creepage and clearance spacing requirements. The galvanic isolation circuit 68 must be capable of passing the current modulated signal, without distortion, to the user terminals TB1.

The secondary of the galvanic isolation block 68 is connected to a rectifier circuit 72 to provide a DC voltage. The result is a DC supply voltage which is loosely controlled by the voltage regulator 60 but tightly passes the loop current. An output filter circuit block 74 receives the rectified DC voltage and includes a low pass filter to suppress the switcher edges. The resulting DC voltage must not have switching frequency noise which could disrupt operation of the unit 10. A safety limiting circuit 76 limits the level of the supply DC voltage to the control system 54. The control system 54 comprises the balance of the two-wire transmitter circuitry contained in the intrinsically safe compartment 26.

The power supply 52 also includes a communication bypass path block 78 which allows communication signals, such as HART, Fieldbus, Profibus, or the like, to bypass the galvanic isolation circuit 68.

Figure 6:
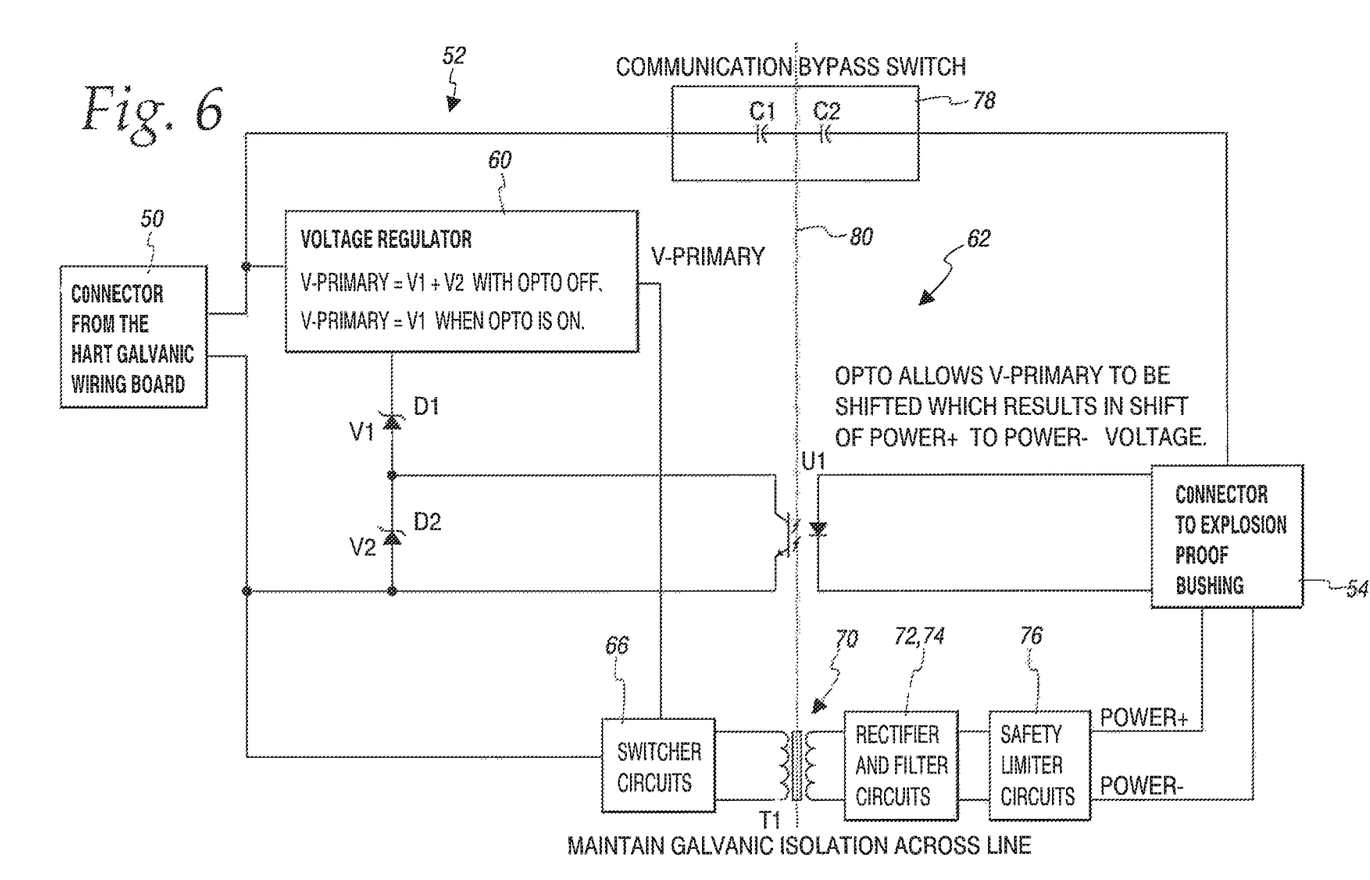
FIG. 6 is a block diagram of a power supply circuit in accordance with one aspect of the invention.

Referring to FIG. 6, the power supply 52 is illustrated in greater detail. The voltage shift control 62 comprises voltage reference devices in the form of series connected Zener diodes D1 and D2 connected to the voltage regulator 60 to set the supply voltage supplied by the voltage regulator 60 at an output labelled V-PRIMARY. The voltage shift control 62 includes an optical coupler U1 defining an isolator circuit controlled by the control system 54 and connected across the second diode D2. The diode D1 provides a voltage reference of V1. The diode D2 provides a voltage reference of V2. The voltage regulator output voltage V-PRIMARY is equal to V1 plus V2 with the optical coupler U1 off and equal to V1 when the optical coupler U1 is on, as the optical coupler U1 provides a short across the second Zener diode D2. Thus, the optical coupler U1 allows the V-PRIMARY level to be shifted by the control system 54 which results in shift of POWER+ to POWER− voltage from the safety limit circuit 76 provided to the control system 54. This is done while maintaining a galvanic isolation barrier, represented by a line 80, between the two-wire circuit 50 and the control system 54.

Figure 7:
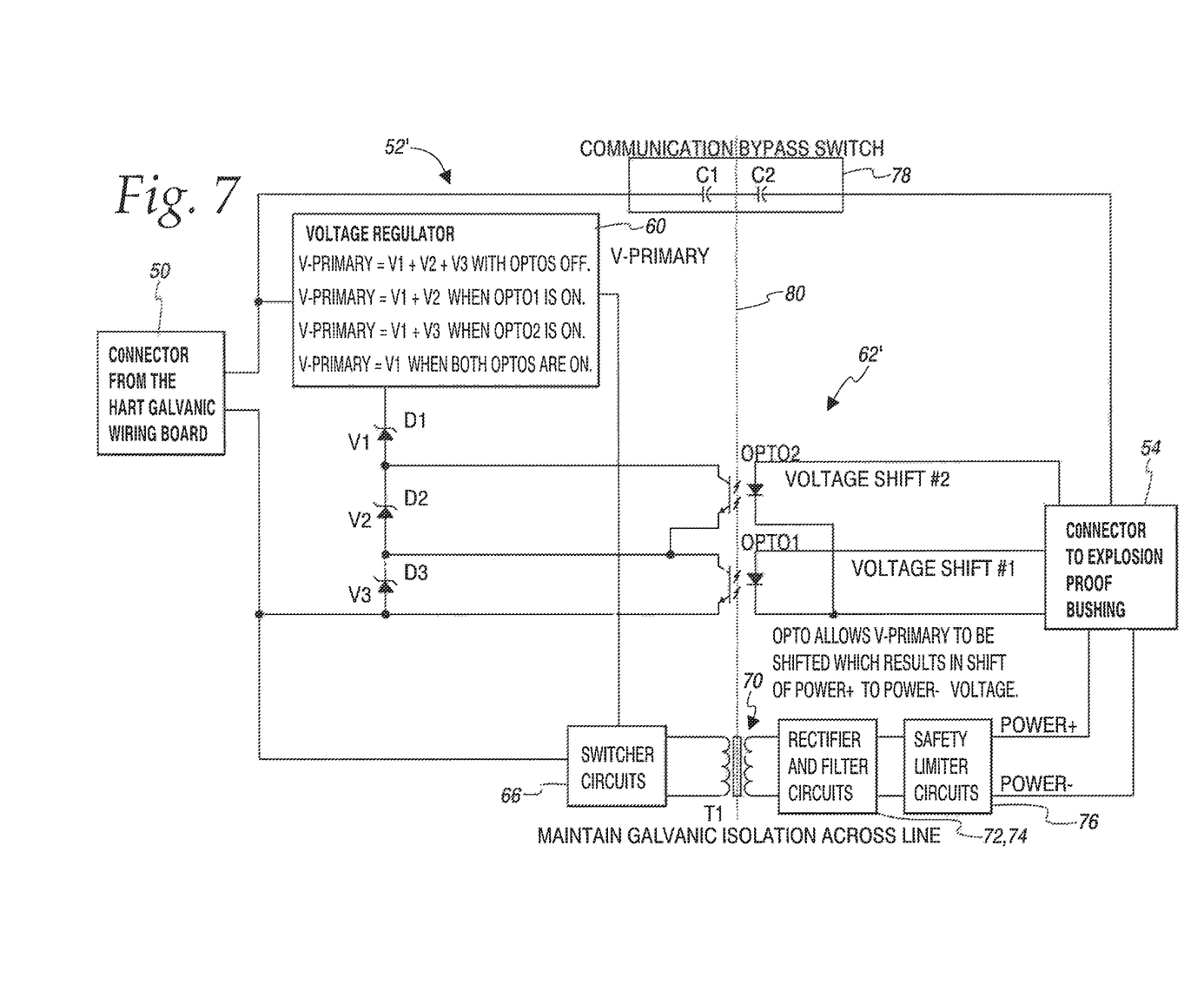
FIG. 7 is a block diagram of a power supply in accordance with another aspect of the invention.

Referring to FIG. 7, a power supply 52' is illustrated which provides four levels of voltage V-PRIMARY. In this instance, the voltage shift control 62' comprises voltage reference devices in the form of three series connected Zener diodes D1, D2 and D3 connected to the voltage regulator 60. The isolator circuit comprises two optical couplers OPTO1 and OPTO2 controlled by the control system 54. The first optical coupler OPTO1 is connected across the Zener diode D3. The second optical coupler OPTO2 is connected across the second Zener diode D2. The first Zener diode D1 provides a voltage reference of V1. The second Zener diode D2 provides a voltage reference of V2. The third Zener diode D3 provides a voltage reference of V3. With this circuitry, the control system 54 is programmed to selectively shift the level of the V-PRIMARY voltage such that it is equal to V1 plus V2 plus V3 with both OPTO1 and OPTO2 off, equal to V1 plus V2 when OPTO1 is on; equal to V1 plus V3 when OPTO2 is on; and V1 when both OPTO1 and OPTO2 are on.

The described system is an explosion proof process control instrument that includes a galvanic isolation power supply 52. The power supply 52 includes a voltage regulator 60 that feeds a current switcher 66 that converts one-to-one current across the transformer 70. The galvanic wiring board 34 is still a two-wire 4 to 20 mA output device; however, the voltage is fixed from the voltage regulator 60 feeding the switching circuit 66. Ultimately, the digital PC board 36 will also take a minimum amount of voltage to run appropriately. Another limitation of the circuit is that the two-wire power source will typically always have a series input resistance for either DAC or HART communication. As current increases, the voltage drop across the two-wire resistance increases which will lower the available voltage to the instrument. The voltage at the terminal block TB1, post two-wire resistance, has to be above the fixed voltage regulator value of the power supply 52. Therefore, a large minimum voltage value to the unit needs to be specified for when the unit is drawing larger amounts of current with a larger series resistance on the two-wire loop.

The power supply 52 provides a controlled voltage level change of the fixed voltage regular 60. As such, the digital PC board 36 controls the voltage shift control 62. If loop current is above a select value, then the voltage regulator 60 will be shifted to a lower value, while at lower loop current values below the select level, the voltage regulator 60 will be shifted to a higher value. The overall effect is to maintain a lower minimum power to the unit which allows a lower minimum power supply voltage to the unit. Allowing lower voltage at higher loop currents will allow lower turn-on voltage to the unit and thus improve the safe operating area by allowing higher loop resistance at a given supply voltage.

Likewise, with the power supply 52 the digital PC board 36 controls the voltage shift control 62 to provide a step wise higher voltage at lower current values which can be selectable based on reference voltages set by Zener diode voltage levels, as will be apparent. Particularly, the digital PC board 36 will be programmed to selectively turn the optical couplers OPTO1 and OPTO2 on or off based on loop current being above or below each of three select levels.

Thus, the described circuits use two voltage shift levels in one aspect and four voltage shift levels in another. However, other controls may be used to allow for more voltage levels. This could be done by using additional optical couplers and other circuitry, as will be apparent.

As discussed, the control of the voltage shift is done by the control circuitry on the digital PC board 36. The control functionality for the voltage shift may be similar to that specified in U.S. Pat. No. 9,714,861, the specification of which is incorporated by reference herein.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A loop powered process control instrument comprising:
a control system measuring a process variable and developing a measurement signal representing the process variable;
a two-wire circuit, for connection to a remote power source using a two-wire process loop, for controlling current on the loop in accordance with the measurement signal; and
a power supply with galvanic isolation, connected to the two-wire circuit and the control system to isolate the two-wire circuit from the control system, for receiving power from the two-wire process loop and supplying power to the control system, wherein the power supply comprises a voltage regulator receiving loop power and developing a regulated output voltage, a current switching circuit receiving the regulated output voltage and driving a primary of a transformer, with a secondary of the transformer coupled to the control system, and a voltage shift control circuit including an isolator circuit driven by the control system for controlling voltage supplied by the voltage regulator.

2. The loop powered process instrument of claim 1 wherein the voltage shift control circuit shifts the voltage regulator voltage to a higher value at lower current levels and to a lower value at higher current levels.

3. The loop powered process instrument of claim 1 wherein the isolator circuit comprises an optical coupler controlled by the control system.

4. The loop powered process instrument of claim 1 wherein the voltage supplied by the voltage regulator is set by plural voltage reference devices and an optical coupler controlled by the control system selectively shifts the voltage.

5. The loop powered process instrument of claim 1 wherein the voltage supplied by the voltage regulator is set by plural voltage reference devices and a plurality of optical couplers controlled by the control system selectively shifts the voltage.

6. The loop powered process instrument of claim 1 wherein the current switching circuit drives the primary of the transformer to provide a one-to-one current ratio of transformer primary current to secondary current.

7. The loop powered process instrument of claim 6 wherein the current switching circuit comprises a switching oscillator of a DC-DC converter circuit and the oscillator drives the primary of the transformer.

8. The loop powered process instrument of claim 7 wherein switching frequency of the switching oscillator is about 150 kHz to pass lower frequency communication signals.

9. The loop powered process instrument of claim 1 wherein the control system controls loop current at the secondary of the transformer.

10. The loop powered process instrument of claim 1 further comprising a dual compartment housing and the two-wire, and the power supply are in an explosion proof compartment of the housing and the control system is in an intrinsically safe compartment of the housing.

11. A two-wire transmitter comprising:
a dual compartment housing defining a wiring compartment and a control compartment;
a control system in the control compartment including a signal processing circuit measuring a process variable and developing a measurement signal representing the process variable; and
a two-wire circuit and a power supply in the wiring compartment, the two-wire circuit for connection to a remote power source using a two-wire process loop, for controlling current on the loop in accordance with the measurement signal, the power supply being connected to the two-wire circuit and the control system to isolate the two-wire circuit from the control system, for receiving power from the two-wire process loop and supplying power to the control system, wherein the power supply comprises a voltage regulator receiving loop power and developing a regulated output voltage, a current switching circuit receiving the regulated output voltage and driving a primary of a transformer, with a secondary of the transformer coupled to the control system, and a voltage shift control circuit including an isolator circuit driven by the control system for controlling voltage supplied by the voltage regulator.

12. The two-wire transmitter of claim 11 wherein the voltage shift control circuit shifts the voltage regulator voltage to a. higher value at lower current levels and to a lower value at higher current levels.

13. The two-wire transmitter of claim 11 wherein the isolator circuit comprises an optical coupler controlled by the control system.

14. The two-wire transmitter of claim 11 wherein the wherein the voltage supplied by the voltage regulator is set by plural voltage reference devices and an optical coupler controlled by the control system selectively shifts the voltage.

15. The two-wire transmitter of claim 11 wherein the voltage supplied by the voltage regulator is set by plural voltage reference devices and a plurality of optical couplers controlled by the control system selectively shift the voltage.

16. The two-wire transmitter of claim 11 wherein the current switching circuit drives the primary of the transformer to provide a one-to-one current ratio of transformer primary current to secondary current.

17. The two-wire transmitter of claim 16 wherein the current switching circuit comprises a switching oscillator of a DC-DC converter circuit and the oscillator drives the primary of the transformer.

18. The two-wire transmitter of claim 17 wherein switching frequency of the switching oscillator is about 150 kHz to pass lower frequency communication signals.

19. The two-wire transmitter of claim 11 wherein the control system controls loop current at the secondary of the transformer.

20. The two-wire transmitter of claim 11 wherein the wiring compartment comprises an explosion proof compartment and the control compartment comprises an intrinsically safe compartment.

* * * * *